United States Patent Office 3,484,774
Patented Dec. 16, 1969

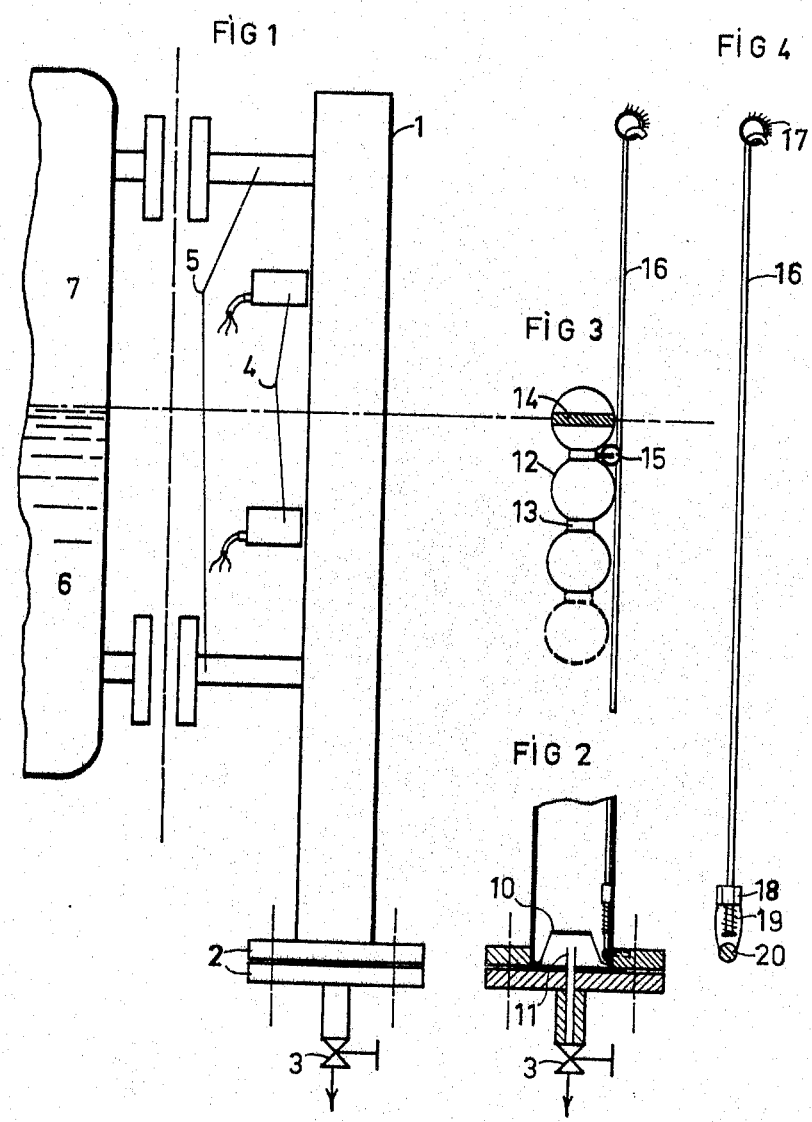

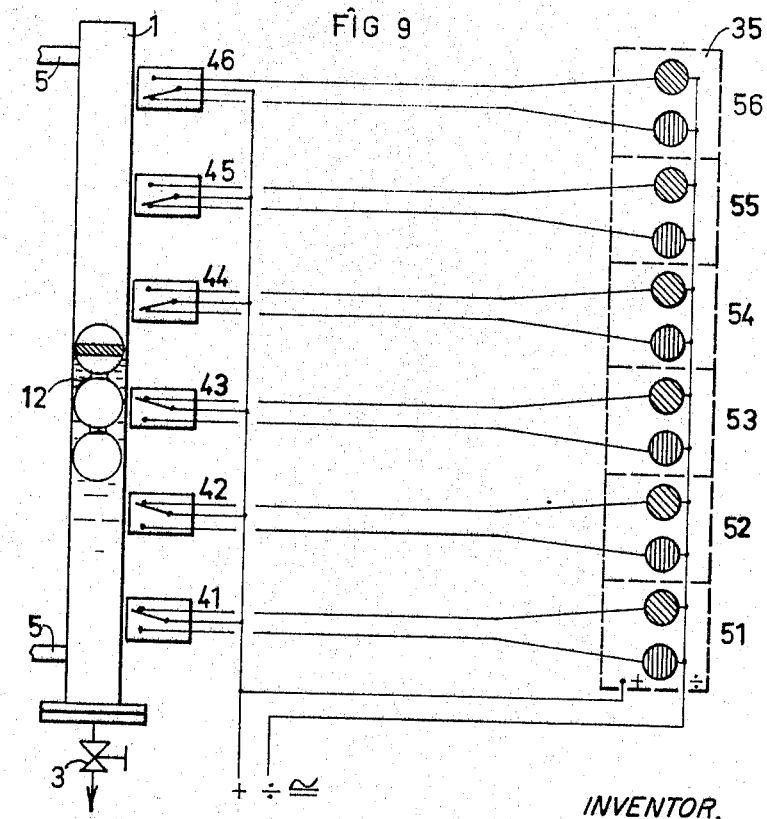

3,484,774
MAGNETICALLY ACTUATED LIQUID LEVEL INDICATOR
Ejvind Cai Borgnakke, 28 Berners Vaenge, Hvidovre, Copenhagen, Denmark
Filed Aug. 23, 1967, Ser. No. 662,774
Claims priority, application Denmark, Aug. 25, 1966, 4,344/66
Int. Cl. G08b 21/00
U.S. Cl. 340—244          3 Claims

ABSTRACT OF THE DISCLOSURE

The invention relates to a liquid level controlled device comprising a stand pipe of non-magnetic material being connected to the liquid and vapour spaces, respectively, of a container, the liquid level of which is to be indicated; within the stand pipe a multiple ball swimmer provided with a permanent magnet system; and outside along the stand pipe a number of magnetic self-locking electric switch units being connected with and serving to operate an electric light tableau in two colours or distant indication of the liquid level.

---

The invention relates to a liquid level indicator means with a distant electric indicator for supervising and indicating the level of a liquid in an open or closed container at atmospheric pressure or at the vapour pressure of the liquid in question, for example for the indication of the after level in the water tank of boilers.

The indicator means is of the kind consisting of a vertical, at both ends closed stand pipe of non-magnetic material, for example stainless steel, metal or plastic, which at the upper and lower ends is connected through branches with the liquid and vapour spaces, respectively, of the container in question, and so that the vertical distance between said branches in equal to, or greater that the allowable differences in the liquid level.

The lower end of the stand pipe is closed with a blind flange by removing of which a swimmer can be introduced into the stand pipe, and the latter can be inspected, if desired.

The lower end of the stand pipe is further equipped with a blow down control, a sediment trap, and a blow down valve so that sludge and the like can be removed from the stand pipe. The swimmer in the stand pipe is provided with a permanent magnet, which is normally enclosed within the swimmer at the liquid level in the stand pipe.

Generally, the said swimmer is in the form of a big ball, a cylinder, or an ellipsoid. If these bodies are to have the necessary bouyancy—big, when the specific weight of the liquid is small—and to be able to withstand a correspondingly high vapour pressure, they must have a big diameter and wall thickness, but this considerably increases the main dimensions and the price of the device.

The object of the invention is to provide a liquid level indicator of improved design as compared with the known devices. A liquid level indicator according to the invention, therefore, comprises an improved swimmer, consisting of a series of small, mutually connected balls—a multiple ball swimmer—flowing in a vertical position in the liquid, and cooperating with a series of electrical switches placed outside along the stand pipe between the connecting branches on the latter, and within the desired liquid level range, said switches hanging over from one contact pole to another under influence of the swimmer magnet during its passage upwards or downwards in the stand pipe.

The said switches are also of a novel design, being particularly resistant to shocks and vibrations of any frequency whatever. The number of switches is determined by the desired number of functions.

The switches being provided with a self-locking magnetic device, so that the position of any of the switches at any given moment indicates, in which direction upwards or downwards the swimmer moved when last passing the switch. This is used for an electric distant indication of the position of the swimmer and thus of the liquid level, a number of switches being fitted in a row along the stand pipe within the range of the liquid levels to be indicated, and connecting the two contact poles of each switch through a multiple core cable with two differently coloured electric bulbs, for example red and green bulbs, the number of bulbs corresponding to the number of switches being arranged in one or two vertical rows in a tableau. The connections are established so as to connect the lower switch with the lower pair of bulbs, and so on upwards. If the connections are further so arranged that the contact pole, which is switched by the swimmer during its passage downwards, is connected to a red bulb, and the other one to a green bulb, the red bulbs of the tableau will be switched on above the liquid level, and the green ones below. If the level changes, the swimmer will pass a switch, and thus cause a switching from a red bulb to a green one, or vice versa.

Several tableaux can be connected to the same set of switches, and several sets of alarm and control impulses can be derived from the same set of switches. The invention also comprises a simplified device with only one or two switches, and without distant indicator means, if desired.

In the following, the invention will be explained in further details with reference to the accompanying drawings of a preferred embodiment of the present liquid level indicator, wherein FIG. 1 is a vertical view of the liquid level indicator,
FIG. 2 the bottom of the stand pipe with a sediment trap, a blow down control, and the lower end of a guide wire for a swimmer,
FIG. 3 a vertical section of the swimmer,
FIG. 4 a vertical view of the guide wire,
FIG. 5 a vertical section of a switch outside the stand pipe,
FIG. 6 the switch of FIG. 5 in horizontal section,
FIG. 7 a front view of an electric distant indicator,
FIG. 8 a side view of same in vertical section, and
FIG. 9 a diagram of the wiring for the electric distant indicator.

The liquid level indicator of FIG. 1 consists of a vertical stand pipe 1, which is closed at the top, and has its bottom closed by a blind flange 2. The latter carries a blow down valve 3, which could also be mounted on the side of the stand pipe at its bottom, if desired. The stand pipe is connected through two branches 5 with the water space 6 and steam space 7 of a boiler. Between the branches 5, a number of switch units 4 are placed in a row along the stand pipe 1. The switch units 4 can be mounted in a housing, which can be adjustable along the stand pipe.

The blow down control of FIG. 2 consists of an annular body 10 with resilient feet abutting in recesses around the inner lower border of the stand pipe. The thus removable blow down control serves as a stop, preventing the swimmer from being pressed against and blocking the opening during a heavy blow down, and also prevents the swimmer from being damaged or lost when the blind flange is removed. The sediment trap 11 consists of a short tube of an internal diameter equal to that of the blow down valve 3, and prevents larger bodies, such as rust flakes and welding beads, from blocking the valve 3.

The swimmer 12 consists of two or more hollow, thin-walled balls. The number of balls is determined by the specific weight of the liquid. The balls are placed in a row and are mutually connected by spacer pieces 13. The magnetic system 14 of the swimmer comprises one or more permanent magnets, acting separately or in conjunction wtih one another. When the swimmer is moving up or down, the said magnet system activates the switch units 4 which are fitted outside the stand pipe 1. The said switch units are arranged in one or more parallel rows, corresponding to the number of available poles in the magnetic system 14. Generally, the said magnetic system is placed within the top ball of the swimmer, and by adjusting the weight of the swimmer 12, the magnetic system is adjusted to be on level with the liquid level of the boiler. The magnetic system may also be placed outside the swimmer, and it may be placed above or below the liquid level, provided that the position of the switch units outside the stand pipe 1 are correspondingly adjusted.

The swimmer is fitted with a guiding device 15 with a guide roll straddling a wire 16 to guide the swimmer during its movement. The guiding device 15 is adjustable to ensure correct positioning of the swimmer.

The wire 16 is placed inside the stand pipe 1 as shown in FIG. 4 and ends at the top in a hook engaging a lug 17 at the top of the stand pipe 1. At the lower end, the wire 16 ends in a yoke 18 resting upon a spring 19. By compressing said spring 19, the loop on the yoke 18 can engage a screw 20 at the bottom of the stand pipe. The spring ensures that the guide wire is always kept tight and rests against the side wall of the stand pipe.

The switch units 4 illustrated, for example, in FIGS. 5 and 6 are enclosed in housings for mechanically protecting the switch mechanism. The latter consists of a changeover switch 21, one or two magnetizable yokes 22 and 23, and a system of one or more permanent magnets 24, which are mounted pivotably through an angle a–b on an axis through its centre of gravity and of inertia so that the system is in both static and dynamic equilibrium in any of its positions and thus unaffected by vibrations and shocks.

The switch unit of FIGS. 5 and 6 is provided with a small auxiliary magnet 25 to draw the tongue of the switch 21 against one of the poles, when not under the influence of the magnet system 24.

The same could be obtained by using a weak leaf spring for the tongue and fixing it so as to press against one of the poles.

Further, the magnetizable yokes 22 and 23 could be replaced by a switch similar to the switch 21 at the position of the yoke 22 so that a switch is provided also at the contact position b. This embodiment is advantageous when impulses are to be given to two different circuits.

In switch units with magnetic yokes 22 and 23 these may for instance be magnetizable screws forming part of the support for the magnet system 24.

The magnet system 24 is self-locking in the contact positions a and b, and the function of the switch unit 4 is as follows:

When the swimmer magnet 14 passes the switch unit, for example moving upwards, the magnet system 24 is turned into position a, where it actuates the switch 21. The magnetic interaction between the switch 21 and the magnet system 24 keeps the latter locked in position a, even if the action of the swimmer magnet 14 ceases, and a change is effected only when the magnet 14 passes in the opposite direction.

The distant level indicator system consists of a suitable number of the switch units 4 being connected by a multi-core cable to a tableau 31 with a number of electric bulbs in one or two vertical rows. The bulbs are in pairs of different colours, for example a red bulb 33 and a green bulb 34, each pair of bulbs being connected with the two poles of the switch 21 in one of the switch units 4 in such manner that only one bulb is illuminated at a time, the current being switched on to the other bulb when the swimmer magnet 14 passes the switch unit 4.

Between the pairs of bulbs 33 and 34, screens 36 are interposed to prevent light from one pair of bulbs to penetrate to the area of the adjoining pair.

A smaller screen 37 between the two bulbs of a pair prevents light from the illuminated bulb to reflect from the other one to give a mixed colour.

A common front plate 32 made from glass or translucent plastic, but made opaque or being internally covered with a reflecting layer, rests against the front edge of the screens 36 and covers all the bulbs. Thus, the bulbs themselves are not visible, but only the coloured light from the illuminated bulb of a pair. The housing 35 of the tableau 31 encloses all the necessary fittings, such as bulb holders and terminals.

In the described arrangement, the indicator will resemble a liquid level column, the liquid being represented by the green bulbs, and the vapour by the red. When the bulbs are arranged in two rows, all red bulbs are in one row, and all green ones in another, the bulbs being paired off in horizontal layers.

The wiring diagram of FIG. 9 shows the connections between six switch units, numbered 41 to 46, and six pairs of bulbs, numbered 51 to 56.

What I claim is:

1. A magnetically actuated liquid level indicator comprising a stand pipe constructed of non-magnetic material, conduit means connecting the stand pipe to the liquid and vapor spaces of a container, the liquid level of which is to be indicated, a plural ball swimmer within said stand pipe, a permanent magnet carried by at least one of said plural balls of the swimmer, a plurality of magnetic self-locking electric switch units adjacent the external surface of the stand pipe, a plural electric light tableau, conductors connecting said switch units in predetermined arrangement to the lights of the electric light tableau.

a guide roll carried by one of said plural balls of the swimmer, a spring biased guide wire mounted within said stand pipe and adapted to be engaged by said guide roll, and means connected to the lower end of said stand pipe providing a sediment trap and stop means for the swimmer and clean-cut valve means associated with said sediment trap.

2. The invention defined in claim 1 wherein the permanent magnet carried by said plural ball swimmer is mounted on an axis through its center of gravity and center of inertia.

3. The invention defined in claim 1 wherein the plural ball swimmer consists of a plurality of hollow detachable ball members whereby the number of balls comprising the plural ball swimmer may be varied in accordance with the specific weight of the liquid, the level of which is to be indicated so that the permanent magnet is maintained on the true level of the surface of the liquid in the stand pipe.

References Cited

UNITED STATES PATENTS

| | | | |
|---|---|---|---|
| 911,786 | 2/1909 | Vaughan | 73—332 X |
| 2,220,675 | 11/1940 | Boehm | 73—328 X |
| 2,339,922 | 1/1944 | Gatewood | 73—290 |
| 2,554,374 | 5/1951 | Melas | 73—311 X |
| 2,603,090 | 7/1952 | Brelsford. | |
| 2,707,395 | 5/1955 | Morschel | 73—290 |
| 2,752,461 | 6/1956 | Euler | 200—84 X |
| 3,155,792 | 11/1964 | Werts. | |
| 3,224,270 | 12/1965 | Karol et al. | 73—313 X |
| 3,200,645 | 8/1965 | Levins | 73—313 |

LOUIS R. PRINCE, Primary Examiner

D. M. YASICH, Assistant Examiner

U.S. Cl. X.R.

73—313